United States Patent
Miyazaki

(10) Patent No.: US 10,174,926 B2
(45) Date of Patent: Jan. 8, 2019

(54) LIGHT SOURCE UNIT AND COOLING METHOD OF THE LIGHT SOURCE UNIT

(71) Applicant: NEC Display Solutions, Ltd., Tokyo (JP)

(72) Inventor: Kenji Miyazaki, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 103 days.

(21) Appl. No.: 15/469,446

(22) Filed: Mar. 24, 2017

(65) Prior Publication Data

US 2017/0307199 A1  Oct. 26, 2017

(30) Foreign Application Priority Data

Apr. 22, 2016 (JP) .................................. 2016-085975

(51) Int. Cl.

| F21V 29/51 | (2015.01) |
|---|---|
| F21V 29/67 | (2015.01) |
| F21V 29/76 | (2015.01) |
| F21V 9/30 | (2018.01) |
| F21V 5/04 | (2006.01) |
| F21V 14/08 | (2006.01) |

(Continued)

(52) U.S. Cl.
CPC ............... *F21V 29/51* (2015.01); *F21V 5/04* (2013.01); *F21V 9/30* (2018.02); *F21V 14/08* (2013.01); *F21V 29/673* (2015.01); *F21V 29/76* (2015.01); *H04N 9/31* (2013.01); *F21Y 2115/30* (2016.08)

(58) Field of Classification Search
CPC ........ F21V 14/08; F21V 29/51; F21V 29/673; F21V 29/76; F21V 5/04; F21V 9/30; F21Y 2115/30; H04N 9/31
See application file for complete search history.

(56) References Cited

U.S. PATENT DOCUMENTS

| 8,705,244 B2 * | 4/2014 | Takeda | ................. | G03B 21/145 353/119 |
| 9,995,996 B2 * | 6/2018 | Masuda | ................. | G03B 21/16 |

(Continued)

FOREIGN PATENT DOCUMENTS

JP          2014-092599 A      5/2014

*Primary Examiner* — Tsion Tumebo
(74) *Attorney, Agent, or Firm* — McGinn IP Law Group, PLLC.

(57) ABSTRACT

The present invention realizes a light source unit and a method of cooling the light source unit that reduces any increase in the ambient temperature of a red solid-state light source and thus reduces any decrease in brightness of the red solid-state light source. The light source unit has: a wall having a window, the wall being provided between a light tunnel-side circulation unit that accommodates a light tunnel that is irradiated by the output light of a solid-state light source and a phosphor wheel-side circulation unit that accommodates a phosphor wheel that is excited by the emitted light of the light tunnel; a light tunnel-side heat-receiving heat sink that is provided in the light tunnel-side circulation unit; a phosphor wheel-side heat-receiving heat sink provided in the phosphor wheel-side circulation unit, a heat-radiating heat sink that is connected to the light tunnel-side heat-receiving heat sink and to the phosphor wheel-side heat-receiving heat sink by means of a heat pipe; and a cooling fan that cools the heat-radiating heat sink.

8 Claims, 9 Drawing Sheets

(51) Int. Cl.
*H04N 9/31* (2006.01)
*F21Y 115/30* (2016.01)

(56) References Cited

U.S. PATENT DOCUMENTS

| | | | | |
|---|---|---|---|---|
| 2007/0139887 | A1* | 6/2007 | Lee | G03B 21/16 361/700 |
| 2007/0236668 | A1* | 10/2007 | Suzuki | G03B 21/16 353/57 |
| 2008/0055563 | A1* | 3/2008 | Momose | G03B 21/16 353/61 |
| 2009/0141249 | A1* | 6/2009 | Yanagisawa | G03B 21/16 353/61 |
| 2011/0032489 | A1* | 2/2011 | Kimoto | G03B 21/16 353/56 |
| 2012/0075599 | A1* | 3/2012 | Park | G03B 21/14 353/121 |
| 2013/0038847 | A1* | 2/2013 | Katou | G02B 5/26 353/98 |
| 2015/0131062 | A1* | 5/2015 | Nishimori | G03B 21/16 353/84 |

* cited by examiner

LIGHT SOURCE UNIT AND COOLING METHOD OF THE LIGHT SOURCE UNIT

This application is based upon and claims the benefit of priority from Japanese patent application No. 2016-085975, filed on Apr. 22, 2016, the disclosure of which is incorporated herein entirety by reference.

TECHNICAL FIELD

The present invention relates to a light source unit that is used in, for example, a projector, and more particularly relates to a light source unit that employs a construction that prevents the infiltration of dust (hereinbelow referred to as a "dustproof construction"), and to a cooling method of the light source unit.

BACKGROUND ART

Solid-state light sources such as LDs (Laser Diodes: semiconductor lasers) and LEDs (Light Emitting Diodes) that have a longer service life than conventionally used mercury lamps are increasingly coming into use as the light sources of projectors.

However, a dustproof construction that prevents a decrease in brightness caused by the infiltration and adherence of dust is necessary for achieving long-term maintenance-free operation. As disclosed in Patent Document 1 (Japanese Unexamined Patent Application Publication No. 2014-092599), one method employs a circulating cooling construction that encloses the entire light source unit such that there are minimal gaps to realize a sealed space, circulates the internal air by means of a circulation fan, and discharges the internal heat to the outside by means of a heat exchanger composed of a heat-receiving heat sink and a heat-radiating heat sink to suppress any increase in the temperature of the internal air.

LITERATURE OF THE PRIOR ART

Patent Documents

Patent Document 1: Japanese Unexamined Patent Application Publication No. 2014-092599

SUMMARY

Problem to be Solved by the Invention

Because a light source unit is required to supply white light, when LDs are used as the solid-state light source, red semiconductor lasers (R-LDs) that emit red (R) laser light, blue semiconductor lasers (B-LDs) that emit blue (B) laser light, and lastly, an excitation semiconductor laser (excitation-LD) that supplies excitation laser light for exciting a phosphor are used. White light is obtained by combining each of the above-described laser lights with the fluorescent light that is emitted due to the excitation light, and this white light is supplied from the light source unit.

The circulation cooling construction of a conventional light source unit takes the entire light source unit as a single circulation unit. In the case of a configuration that uses an excitation semiconductor laser and phosphor, the phosphor that emits fluorescent light generates a great amount of heat and the increase in temperature of the air inside the entire light source unit is also great.

The decrease in brightness due to high temperature is greater for the R-LDs than for the B-LDs, and when the temperature in the light source unit increases and the temperature in the vicinity of each LD rises, the brightness of the R-LDs suffers a much greater decrease than the brightness of the B-LDs, giving rise to a change of the color of the white light that is supplied. As a result, in order to maintain the brightness of the R-LDs, the number of R-LDs must be increased or the current value for driving the R-LDs must be increased, but because these measures also result in an increase of the amount of heat produced and an increase of the temperature of the internal air, the efficiency of the brightness with respect to the electrical input of the R-LDs decreases.

The above-described phenomenon in semiconductor lasers also similarly occurs in the case of LEDs.

The present invention realizes a light source unit and a cooling method of the light source unit that reduces increase of the temperature in the vicinity of a red solid-state light source and decreases the reduction of the brightness of the red solid-state light source.

Means for Solving the Problem

The light source unit according to the present invention includes:

a light-tunnel-side circulation unit that accommodates a light tunnel that is irradiated by the output light of a solid-state light source;

a phosphor wheel-side circulation unit that accommodates a phosphor wheel that is excited by the emitted light of the light tunnel;

a first wall that is provided between the light-tunnel-side circulation unit and the phosphor-wheel-side circulation unit and that is provided with a window through which emitted light of the light tunnel passes;

a light tunnel-side heat-receiving heat sink that is provided in the light-tunnel-side circulation unit;

a light tunnel-side circulation fan that supplies and circulates gas that has passed the light-tunnel-side heat-receiving heat sink through the light-tunnel-side circulation unit and toward the light-tunnel-side heat-receiving heat sink;

a phosphor wheel-side heat-receiving heat sink that is provided in the phosphor-wheel-side circulation unit;

a phosphor wheel-side circulation fan that supplies and circulates gas that has passed the phosphor wheel-side heat-receiving heat sink through the phosphor-wheel-side circulation unit and toward the phosphor wheel-side heat-receiving heat sink;

a heat-radiating heat sink that is connected to the light-tunnel-side heat-receiving heat sink and to the phosphor wheel-side heat-receiving heat sink by means of a heat pipe; and a cooling fan that cools the heat-radiating heat sink.

The cooling method of the light source unit according to the present invention includes steps of: accommodating a light tunnel into which is irradiated output light of a solid-state light source in a light-tunnel-side circulation unit;

accommodating a phosphor wheel that is excited by the emitted light of the light tunnel in a phosphor-wheel-side circulation unit;

providing a first wall between the light-tunnel-side circulation unit and the phosphor-wheel-side circulation unit that is provided with a window that allows the passage of the emitted light of the light tunnel;

providing a light-tunnel-side heat-receiving heat sink in the light-tunnel-side circulation unit;

by means of a light-tunnel-side circulation fan, supplying and circulating gas that has passed by way of the light-tunnel-side heat-receiving heat sink to the light tunnel-side circulation unit and directing the gas to the light-tunnel-side heat-receiving heat sink;

providing a phosphor wheel-side heat-receiving heat sink in the phosphor-wheel-side circulation unit;

by means of a phosphor wheel-side circulation fan, supplying and circulating gas that has passed by way of the phosphor wheel-side heat-receiving heat sink in the phosphor-wheel-side circulation unit and directing the gas to the phosphor wheel-side heat-receiving heat sink;

connecting a heat-radiating heat sink to the light-tunnel-side heat-receiving heat sink and the phosphor wheel-side heat-receiving heat sink by means of a heat pipe; and cooling the heat-radiating heat sink by means of a cooling fan.

Effect of the Invention

The present invention enables a reduction of the increase of temperature in the vicinity of the R-LD and reduces any decrease in the brightness of the R-LD.

EXAMPLE EMBODIMENT

An example embodiment of the present invention is next described with reference to the accompanying drawings.

Figure 1:
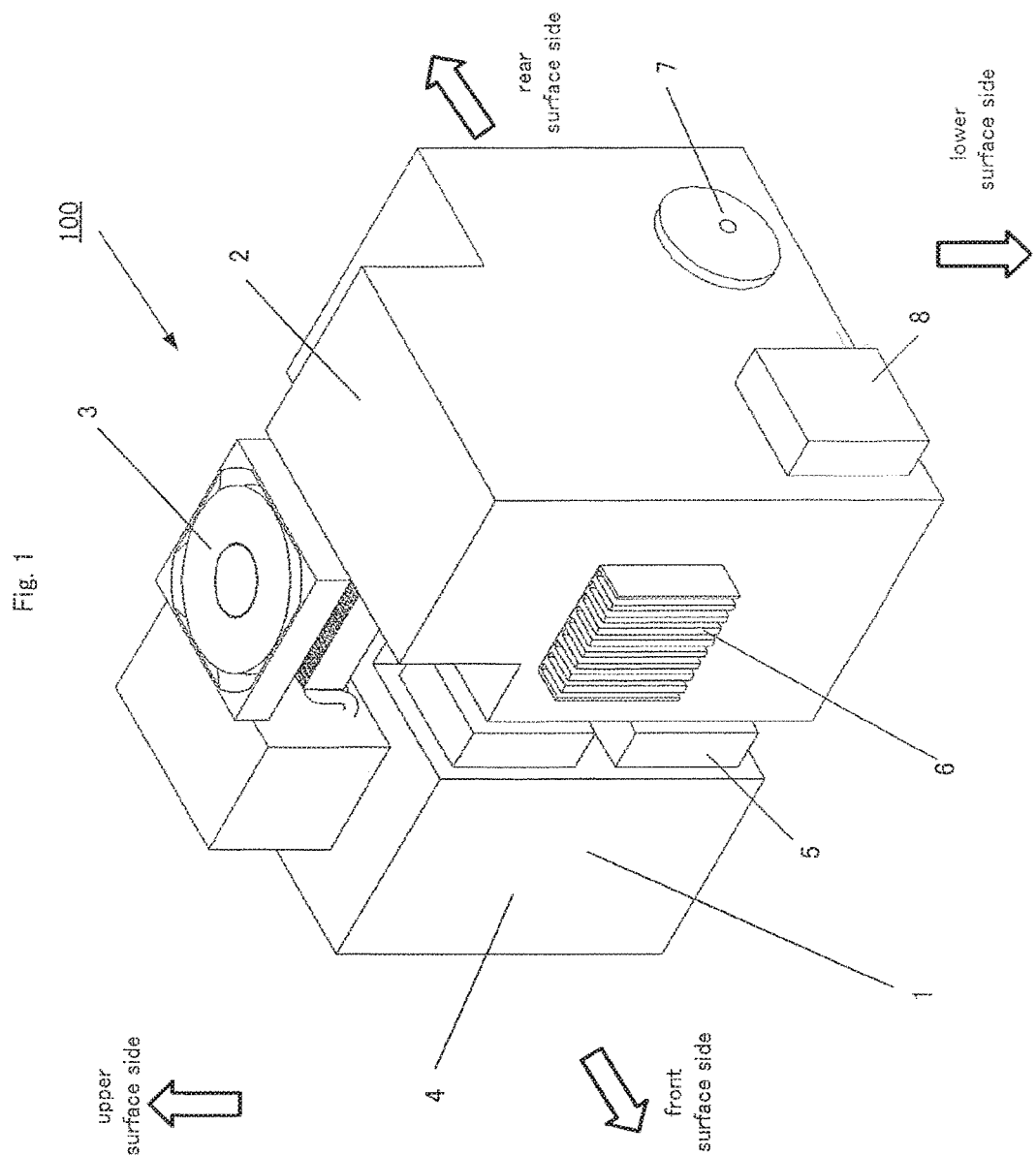
FIG. 1 is a perspective view of an example embodiment of light source unit 100 according to the present invention.
Figure 2:
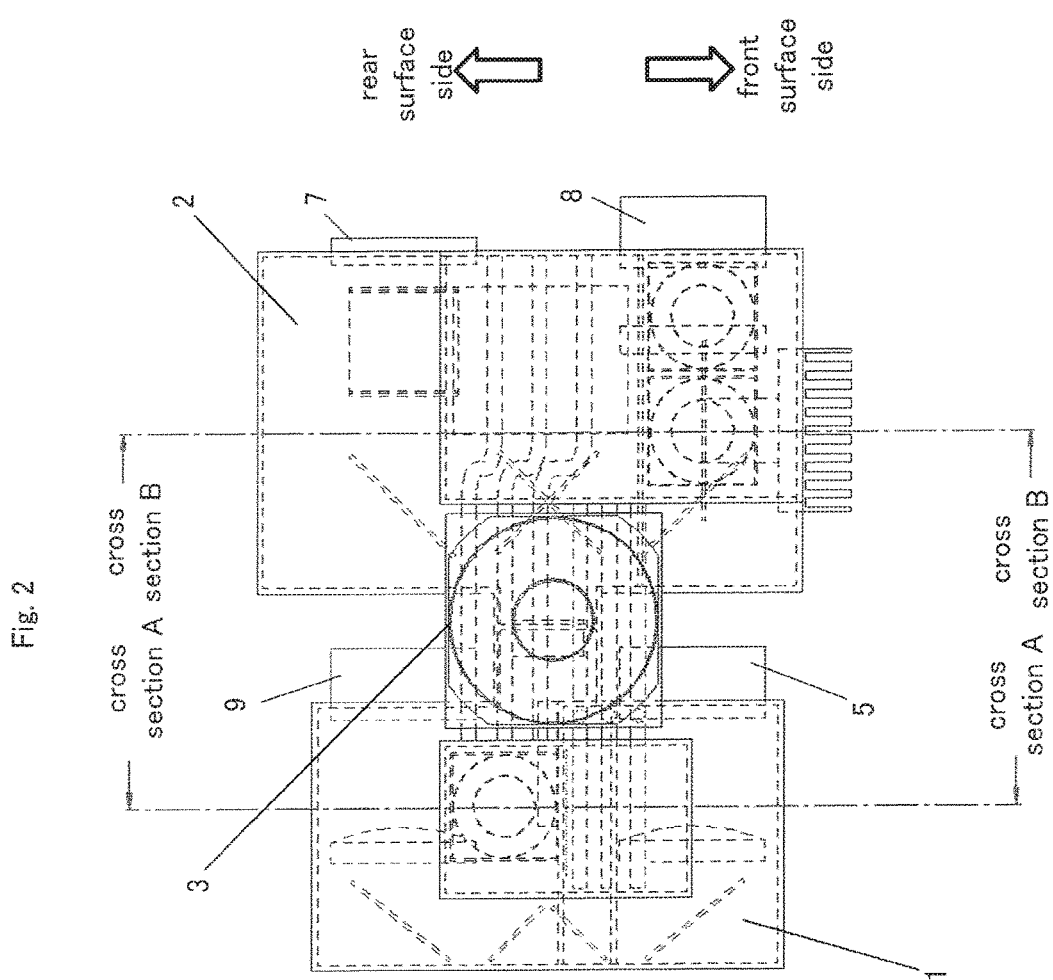
FIG. 2 is an upper plan view of an example embodiment of light source unit 100 according to the present invention.

FIG. 1 and FIG. 2 are a perspective view and an upper plan view, respectively, of an example embodiment of light source unit 100 according to the present invention. The cooling unit of the present example embodiment includes LT-side circulation unit 1 that is provided with a light tunnel (LT) that is irradiated by light from each semiconductor laser and that uniformizes and emits light; and PW-side circulation unit 2 that is provided with a phosphor wheel (PW) that produces fluorescent light in response to excitation light from LT-side circulation unit 1.

As shown in the figures, excitation-LD 4, R-LD 5 and excitation-LD 9 are provided in LT-side circulation unit 1, and cooling fins 6, emission port 7 from which white light is emitted, and B-LD 8 are provided in PW-side circulation unit 2. Heat sink cooling fan 3 is provided on the upper surface between LT-side circulation unit 1 and PW-side circulation unit 2.

Figure 3:
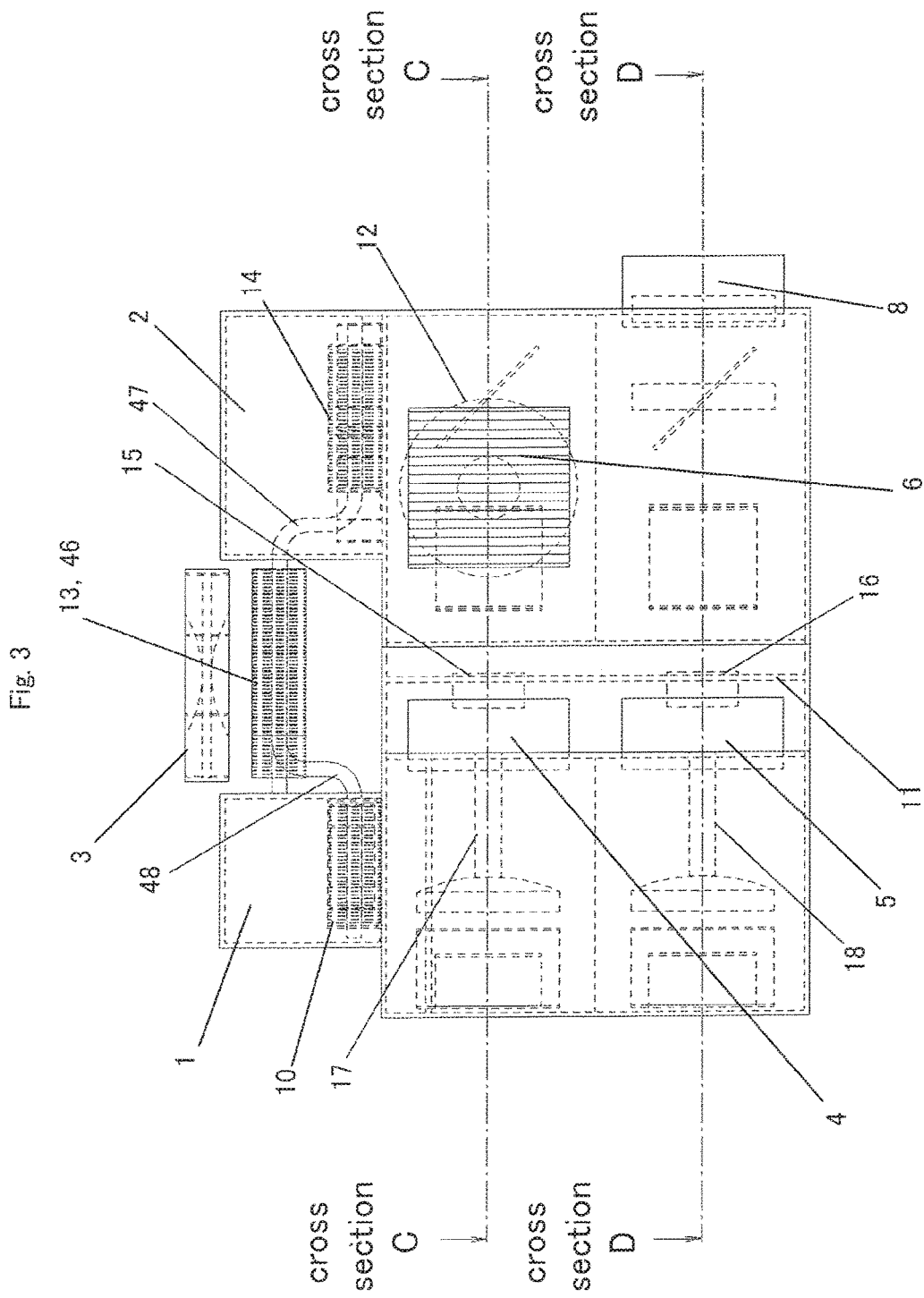
FIG. 3 is a frontal view of light source unit 100.
Figure 8:
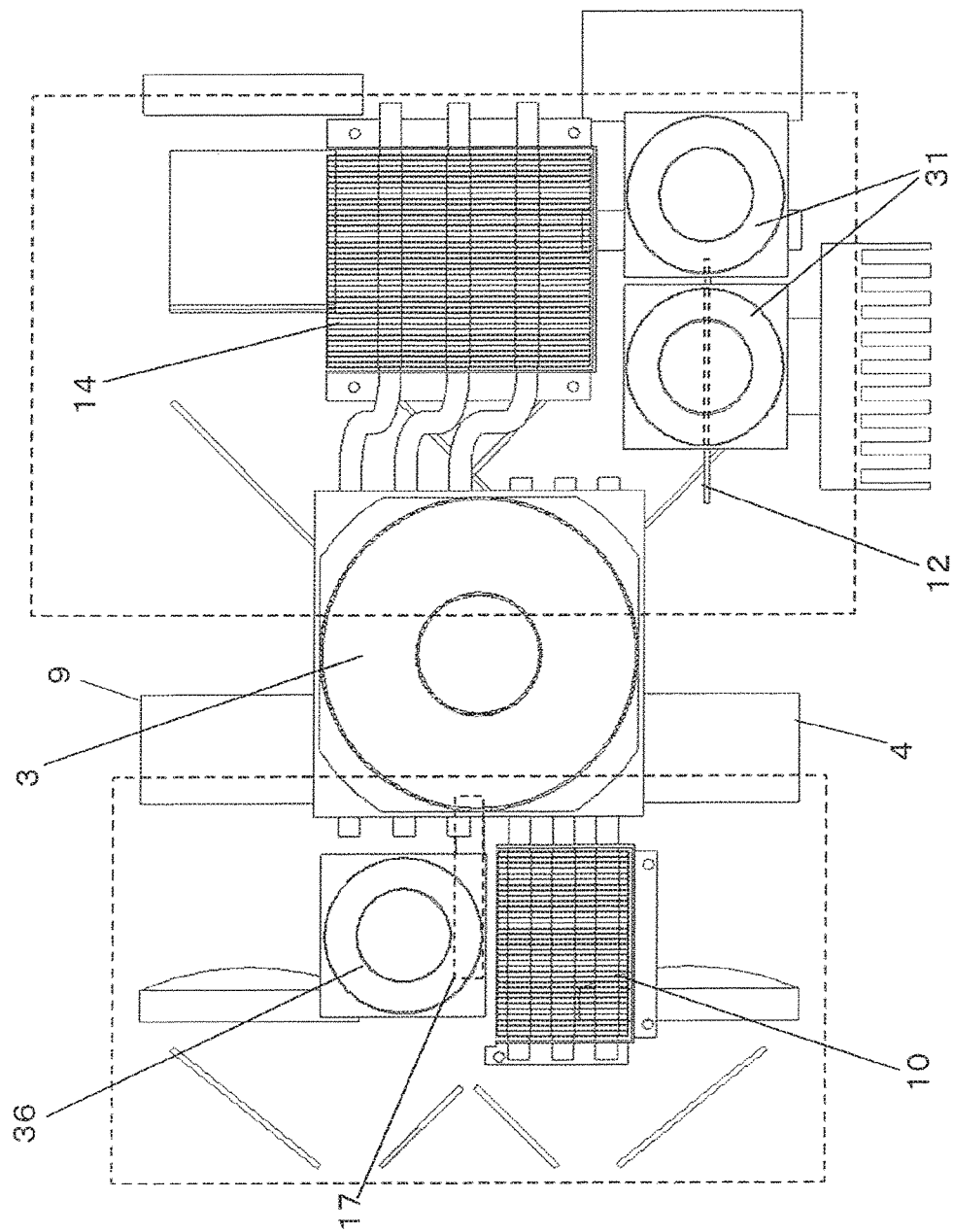
FIG. 8 shows the internal configuration of light source unit 100.
Figure 9:
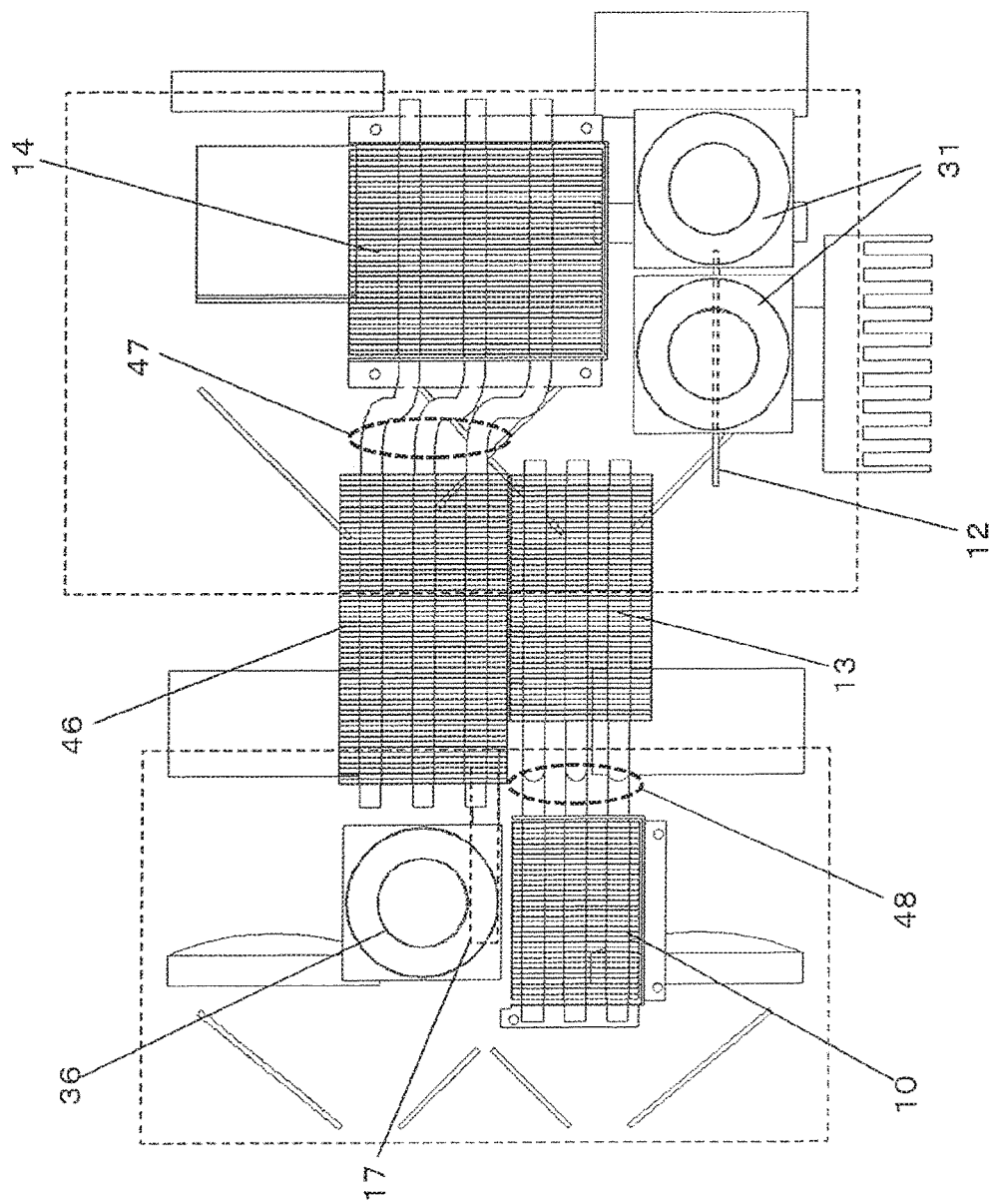
FIG. 9 shows the internal configuration of light source unit 100.

FIG. 3 is a frontal view of light source unit 100, and FIGS. 8 and 9 show the internal configuration. In FIG. 9, heat sink cooling fan 3 is omitted to more clearly show the internal configuration.

As shown in FIG. 3, wall 11 (the first wall) is provided between LT-side circulation unit 1 and PW-side circulation unit 2. Windows 15 and 16 that are composed of glass or an optical component realized by a material through which laser light can pass are formed in wall 11 whereby light is able to pass between LT-side circulation unit 1 and PW-side circulation unit 2 but, because gas cannot pass through, the flow of gas is blocked.

Light-tunnel-side heat-receiving heat sink 10 and LT-side circulation fan 36 are provided on the upper portion of LT-side circulation unit 1, and PW-side heat-receiving heat sink 14 and PW-side circulation fan 31 are provided on the upper portion of PW-side circulation unit 2. LT-side heat-receiving heat sink 10 is connected to LT-side heat-radiating heat sink 13 by means of LT-side heat pipe 48, and PW-side heat-receiving heat sink 14 is connected to PW-side heat-radiating heat sink 46 by means of PW-side heat pipe 47. LT-side heat-radiating heat sink 13 and PW-side heat-radiating heat sink 46 are provided outside LT-side circulation unit 1 and PW-side circulation unit 2, and heat sink cooling fan 3 is provided above. In this way, the heat inside LT-side circulation unit 1 and PW-side circulation unit 2 is discharged to the outside.

Excitation light tunnel (excitation LT) 17 into which excitation laser light is irradiated and R-LT 18 into which red laser light is irradiated are provided inside LT-side circulation unit 1, and phosphor wheel 12 that is connected to cooling fins 6 is provided inside PW-side circulation unit 2.

Figure 4:
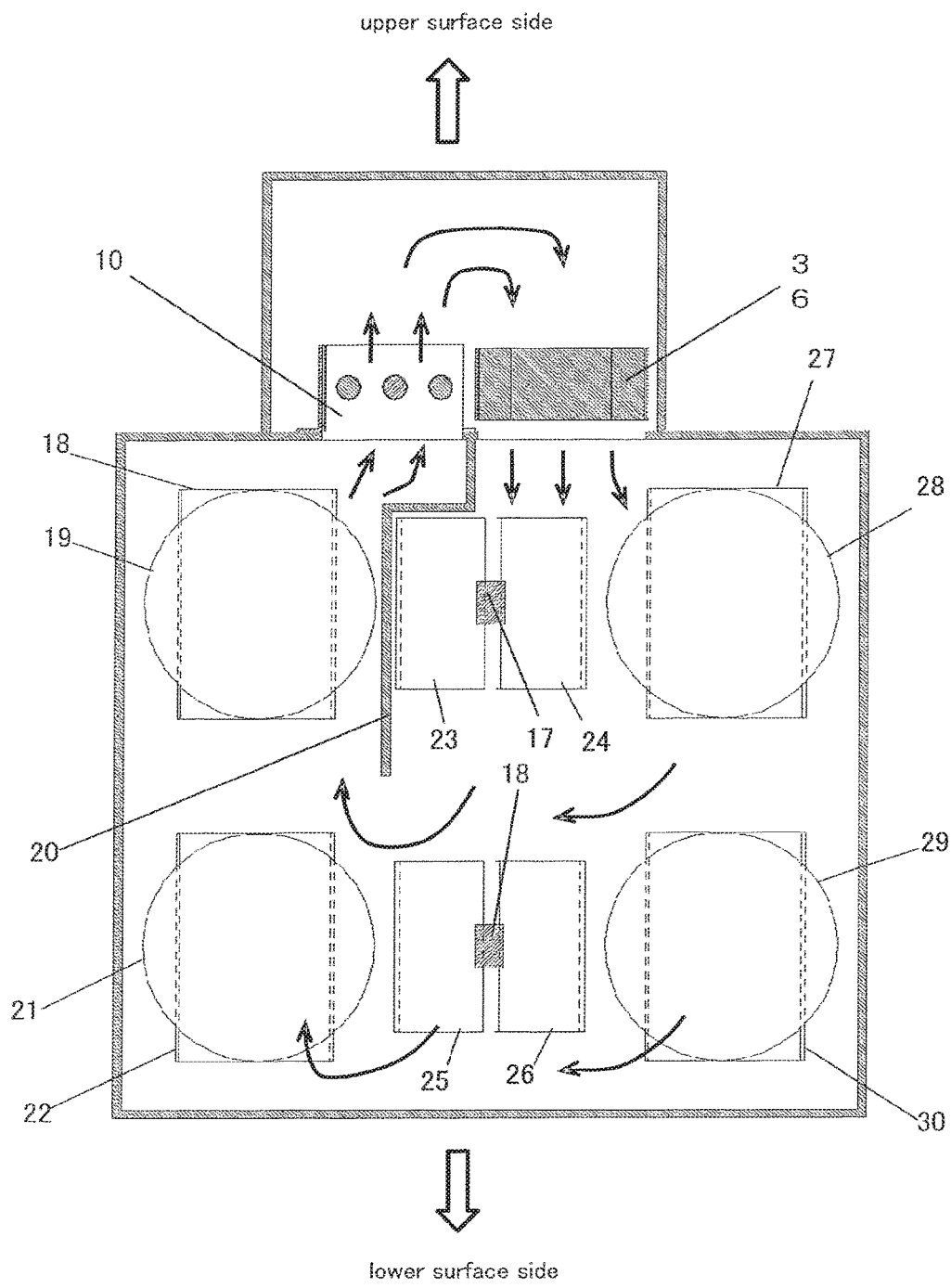
FIG. 4 is a sectional view taken along line A-A in FIG. 2.
Figure 5:
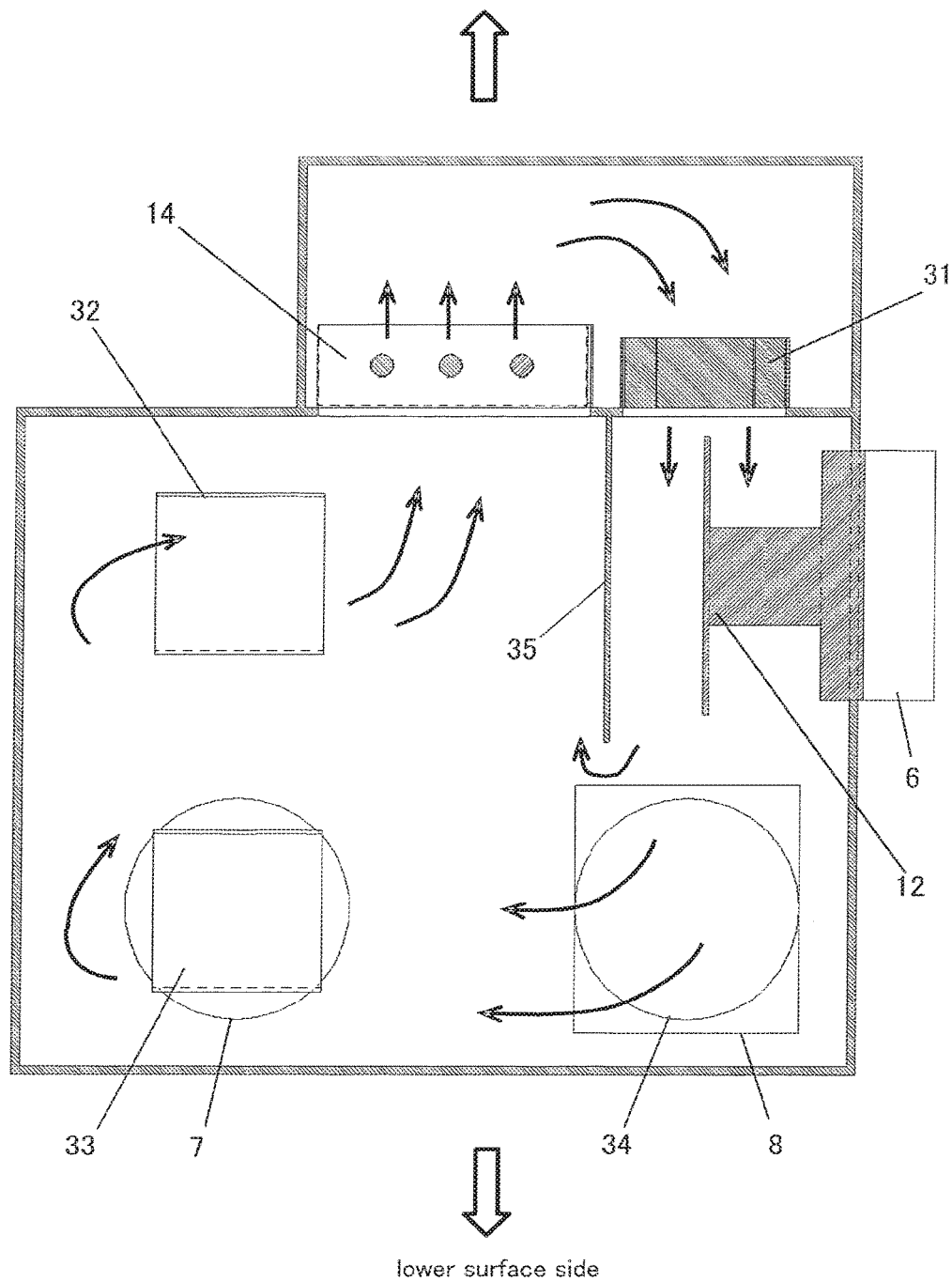
FIG. 5 is a sectional view taken along line B-B in FIG. 2.
Figure 6:
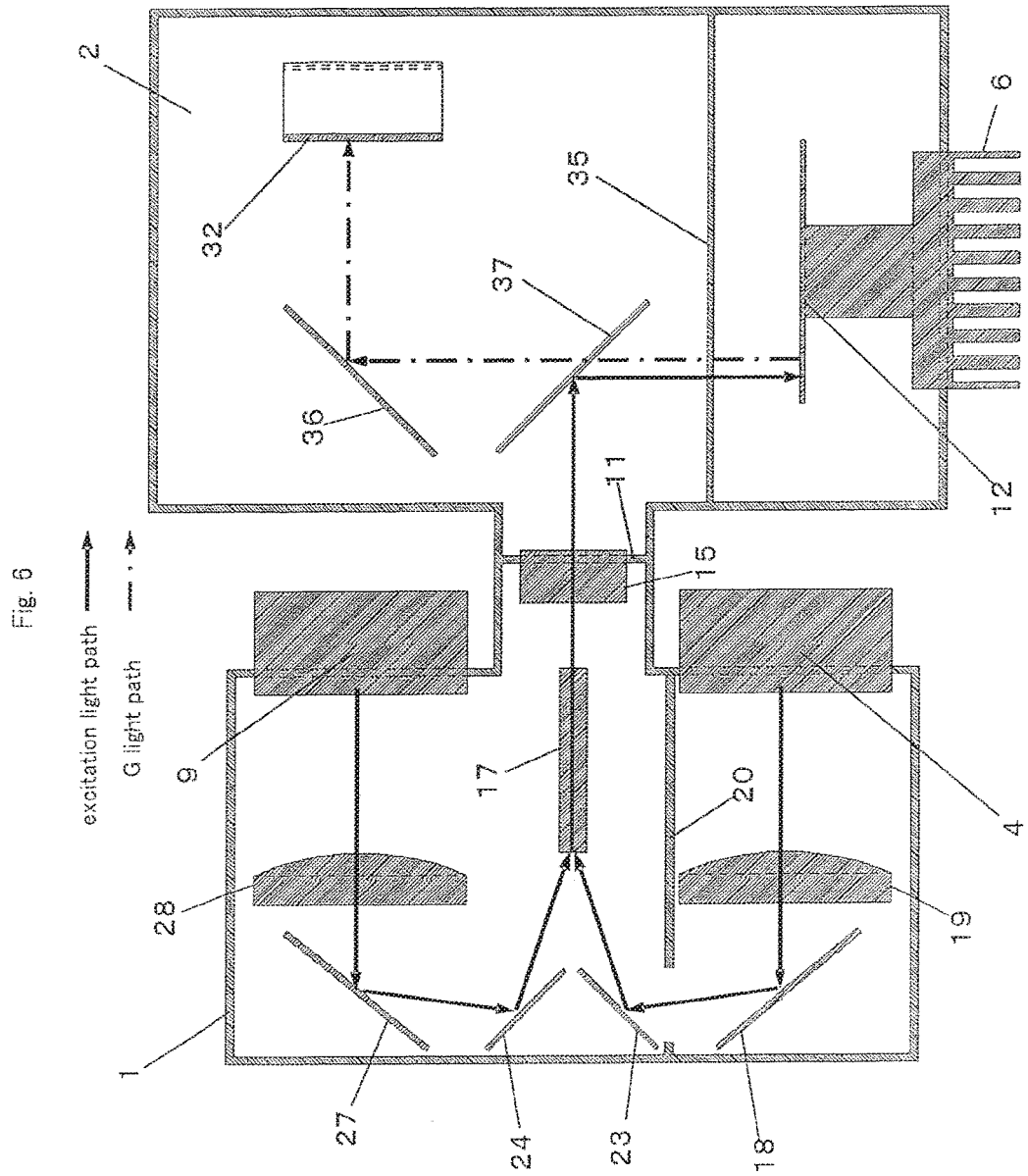
FIG. 6 is a sectional view taken along line C-C in FIG. 3.
Figure 7:
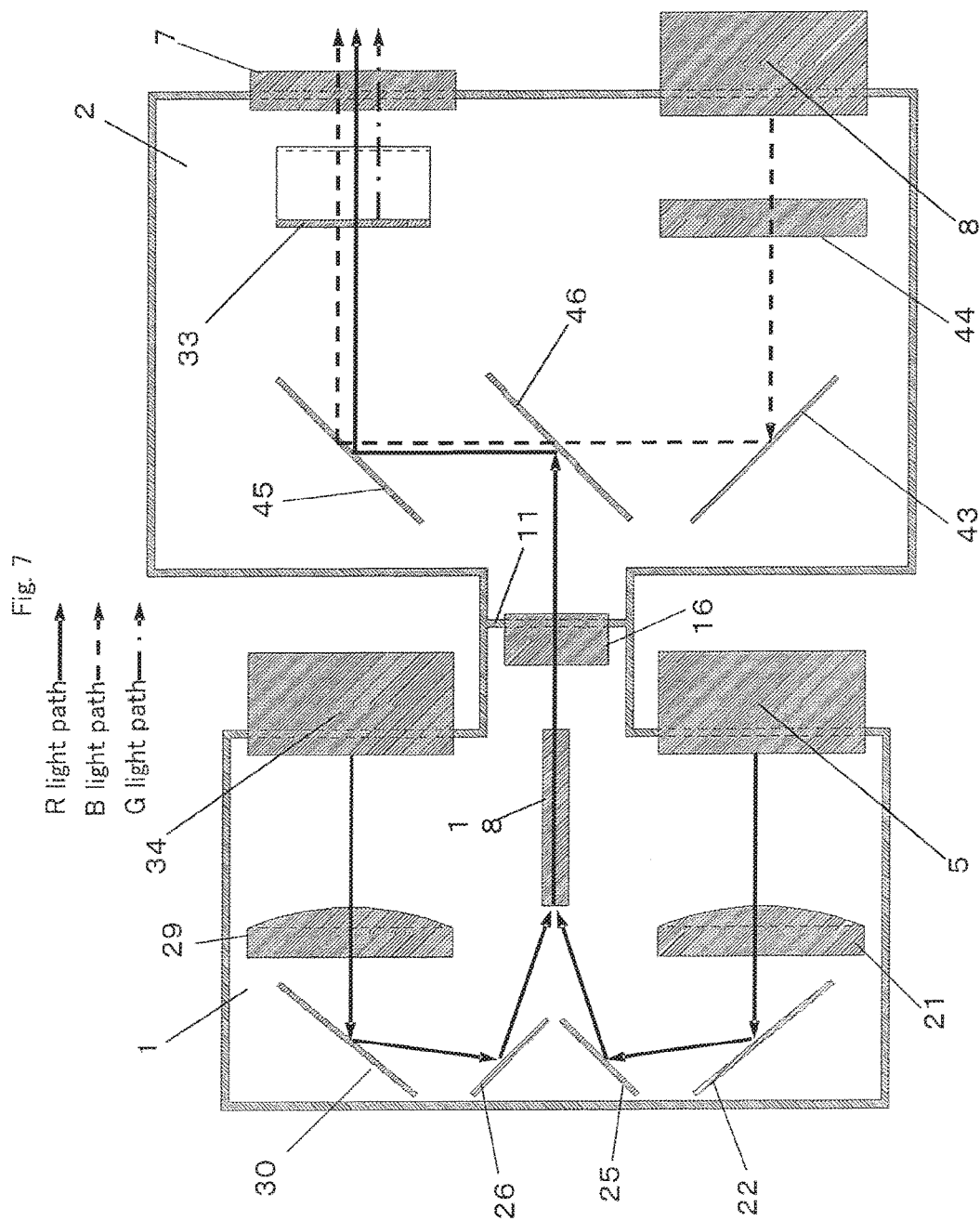
FIG. 7 is a sectional view taken along line D-D in FIG. 3.

FIG. 4 is a sectional view taken along line A-A in FIG. 2, FIG. 5 is a sectional view taken along line B-B in FIG. 2, FIG. 6 is a sectional view taken along line C-C in FIG. 3, and FIG. 7 is a sectional view taken along line D-D in FIG. 3.

As shown in FIG. 6, excitation laser light emitted from excitation-LDs 4 and 9 that are provided on the upper portion of LT-side circulation unit 1 is irradiated into excitation LT 17 by way of lenses 19 and 28 and mirrors 18, 27, 23 and 24, and irradiated into PW-side circulation unit 2 by way of window 15.

In PW-side circulation unit 2, light of the wavelength of the excitation laser light is reflected and returned toward phosphor wheel 12 by dichroic mirror 37 that transmits light of the green wavelength. Phosphor wheel 12 is a rotatable component on which a phosphor is formed that emits green fluorescent light in response to excitation by excitation laser light, and the emitted green fluorescent light therefore passes through dichroic mirror 37, is returned by mirrors 36 and 32, and is directed below PW-side circulation unit 2.

A portion of the heat that is produced in phosphor wheel 12 is radiated from cooling fins 6 that are connected to phosphor wheel 12, but most of the heat is radiated inside PW-side circulation unit 2. At this time, PW-side circulation unit 2 and LT-side circulation unit 1 are separated by wall 11 and there is no ingress or egress of gas, whereby the effect of the heat produced in phosphor wheel 12 upon LT-side circulation unit 1 is extremely slight.

As shown in FIG. 7, the red laser light that is emitted from R-LDs 5 and 34 that are provided below LT-side circulation unit 1 is irradiated into R-LT 18 by way of lenses 21 and 29 and mirrors 22, 30, 25, and 26 and irradiated into PW-side circulation unit 2 by way of window 16.

In PW-side circulation unit 2, light of the red wavelength is reflected and returned toward mirror 45 by dichroic mirror 46 that transmits light of the blue wavelength. Blue laser light that is emitted from B-LD 8 and that passes by way of lens 44, mirror 43, and dichroic mirror 46 is irradiated into mirror 45, and the blue laser light is irradiated into dichroic mirror 33 together with the red laser light.

Apart from the blue laser light and the red laser light, the green fluorescent light that is returned by mirror 32 is irradiated into dichroic mirror 33, and by the passage of light of the blue and red wavelengths and reflection of light of the green wavelength, white light that is realized by these three colors is emitted toward emission port 7.

In LT-side circulation unit 1, the flow of gas inside LT-side circulation unit 1 is formed by LT-side circulation fan 36 and wall 20 (second wall) as shown in FIG. 4. The gas inside LT-side circulation unit 1 is cooled by passage through LT-side heat-receiving heat sink 10 that is provided on the upper portion of LT-side circulation unit 1 and supplied to LT-side circulation unit 1 by means of LT-side circulation fan 36 that is adjacent to LT-side heat-receiving heat sink 10.

Wall 20 is provided between LT-side circulation fan 36 and LT-side heat-receiving heat sink 10 so as to partition the cooling flow that is supplied to LT-side circulation unit 1 by means of LT-side circulation fan 36 and the cooling flow that is directed toward LT-side heat-receiving heat sink 10. As a result, the cooling flow passes through the internal components as shown by the arrows of FIG. 4 and then arrives at LT-side heat-receiving heat sink 10. The gas whose temperature has increased due to the heat generated by the internal components undergoes thermal exchange at LT-side heat-receiving heat sink 10, but because LT-side heat-receiving heat sink 10 and LT-side heat-radiating heat sink 13 are connected by LT-side heat pipe 48 as shown in FIG. 9, the heat that is received by LT-side heat-receiving heat sink 10 moves to LT-side heat-radiating heat sink 13 and is cooled by heat sink cooling fan 3 shown in FIG. 8. As a result, the temperature of the gas that has passed through LT-side heat-receiving heat sink 10 is lowered, and the internal components are then cooled by again supplying the gas to LT-side circulation unit 1 by means of LT-side circulation fan 36.

In PW-side circulation unit 2, the flow of gas in PW-side circulation unit 2 is formed by PW-side circulation fan 31 and wall 35 (the third wall) as shown in FIG. 5. The gas inside PW-side circulation unit 2 is cooled by passage though PW-side heat-receiving heat sink 14 that is provided on the upper portion of PW-side circulation unit 2 and is then supplied to PW-side circulation unit 2 by means of PW-side circulation fan 31 that is adjacent to PW-side heat-receiving heat sink 14.

Wall 35 is provided between PW-side circulation fan 31 and PW-side heat-receiving heat sink 14 so as to partition the cooling flow that is supplied to PW-side circulation unit 2 by means of PW-side circulation fan 31 and the cooling flow that is directed toward PW-side heat-receiving heat sink 14. As a result, the cooling flow passes around the internal components as shown by the arrows of FIG. 5 and arrives at PW-side heat-receiving heat sink 14. The gas whose temperature has increased due to the heat generated by the internal components and undergoes heat exchange in PW-side heat-receiving heat sink 14, but because PW-side heat-receiving heat sink 14 and PW-side heat-radiating heat sink 46 are connected by PW-side heat pipe 47 as shown in FIG. 9, the heat received at PW-side heat-receiving heat sink 14 is transferred to PW-side heat-radiating heat sink 46 and is cooled by heat sink cooling fan 3 shown in FIG. 8. As a result, the gas that leaves PW-side heat-receiving heat sink 14 has a lower temperature, and the internal components are cooled by again supplying the gas to PW-side circulation unit 2 by means of PW-side circulation fan 31.

Because the amount of heat generated in PW-side circulation unit 2 is greater than in LT-side circulation unit 1, two PW-side circulation fans 31 are provided in contrast to a single LT-side circulation fan 36 that is provided. In addition, larger components are used for PW-side heat-receiving heat sink 14 and PW-side heat-radiating heat sink 46 than for LT-side heat-receiving heat sink 10 and LT-side heat-radiating heat sink 13.

Because LT-side heat-radiating heat sink 13 that is connected to LT-side heat-receiving heat sink 10 by means of LT-side heat pipe 48 and PW-side heat-radiating heat sink 46 that is connected to PW-side heat-receiving heat sink 14 by means of PW-side heat pipe 47 are adjacent, these components can be cooled by a single heat sink cooling fan 3 to thus realize a compact configuration.

Although LT-side heat-radiating heat sink 13 and PW-side heat-radiating heat sink 46 in the present example embodiment are provided as heat-radiating heat sinks that correspond to LT-side heat-receiving heat sink 10 and PW-side heat-receiving heat sink 14, respectively, these components may be replaced by a single common heat-radiating heat sink for LT-side heat-receiving heat sink 10 and PW-side heat-receiving heat sink 14. The use of separate components, as in the present example embodiment, increases the degree of freedom of the arrangement. Alternatively, using a single component can reduce the number of components.

In the present example embodiment that is configured as described hereinabove, the optical disposition is substantially symmetrical centering on excitation LT 17 from excitation LDs 4 and 9 to excitation LT 17, and excitation LT 17 is arranged in the vicinity of the center of light source unit 100. Excitation LT 17 is subject to a great amount of generated heat due to the condensing of excitation laser light from excitation LDs 4 and 9, but because LT-side circulation fan 36 is arranged above excitation LT 17 and because excitation LT 17 is arranged at a position that immediately follows the supply of the cooling flow from LT-side circulation fan 36 to LT-side circulation unit 1 as shown in FIGS. 4 and 9, excitation LT 17 is efficiently cooled.

The power of the excitation laser light that is supplied by excitation LDs 4 and 9 to produce green light (G light) is greater than that of the red laser light supplied by R-LDs 5 and 34, and excitation LT 17 therefore generates more heat than R-LT 18. In the present example embodiment, arranging excitation LT 17 closer to LT-side circulation fan 36 than R-LT 18 results in a configuration that is advantageous for cooling.

In addition, PW-side circulation fan 31 is arranged above phosphor wheel 12 as shown in FIGS. 5 and 9, but phosphor wheel 12 is arranged in the vicinity of PW-side circulation fan 31 and is therefore cooled efficiently.

In addition, although semiconductor lasers were used as the solid-state light sources in the above-described example embodiment, LEDs may also be used.

As described in the foregoing explanation, in the present example embodiment, LT-side circulation unit 1 that includes R-LDs 5 and 34 and PW-side circulation unit 2 that includes phosphor wheel 12 are divided by inserting of a center wall as a partition.

The adoption of the above-described construction separates the gas that circulates through LT-side circulation unit 1 that includes R-LDs 5 and 34 and PW-side circulation unit 2 that includes phosphor wheel 12, whereby the increase in temperature resulting from the generated heat of phosphor wheel 12 is produced only in PW-side circulation unit 2 and the increase in temperature in LT-side circulation unit 1 is produced only by the generated heat of components included in LT-side circulation unit 1, and as a result, the above-described construction can limit both a increase of the ambient temperature of R-LDs 5 and 34 and a reduction of brightness.

In each of the example embodiments described hereinabove, the configurations shown in the drawings are merely examples, and the present invention is not limited to these configurations.

All or a portion of the above-described example embodiments can be described as shown hereinbelow but are not limited to the following configurations.

While the invention has been particularly shown and described with reference to example embodiments thereof, the invention is not limited to this embodiment. It will be understood by these of ordinary skill in the art that various changes in form and details may be made therein without departing from the spirit and scope of the present invention as defined by the claims.

Also, part or all of the exemplary embodiment can be described as in the following supplementary notes. However, the present invention is not limited to the following supplementary notes.

(Supplementary Note 1)

A light source unit comprising:

a light-tunnel-side circulation unit that accommodates a light tunnel that is irradiated by the output light of a solid-state light source;

a phosphor wheel-side circulation unit that accommodates a phosphor wheel that is excited by the emitted light of said light tunnel;

a first wall that is provided between said light-tunnel-side circulation unit and said phosphor-wheel-side circulation unit and that is provided with a window through which the emitted light of said light tunnel passes;

a light tunnel-side heat-receiving heat sink that is provided in said light-tunnel-side circulation unit;

a light tunnel-side circulation fan that supplies and circulates gas that has passed by way of said light-tunnel-side heat-receiving heat sink, through said light-tunnel-side circulation unit, and toward said light-tunnel-side heat-receiving heat sink;

a phosphor wheel-side heat-receiving heat sink that is provided in said phosphor-wheel-side circulation unit;

a phosphor wheel-side circulation fan that supplies and circulates gas that has passed by way of said phosphor wheel-side heat-receiving heat sink, through said phosphor-wheel-side circulation unit, and toward said phosphor wheel-side heat-receiving heat sink;

a heat-radiating heat sink that is connected to said light-tunnel-side heat-receiving heat sink and to said phosphor wheel-side heat-receiving heat sink by means of a heat pipe; and a cooling fan that cools said heat-radiating heat sink.

(Supplementary Note 2)

The light source unit as set forth in supplementary note 1, wherein said heat-radiating heat sink is made up of a light-tunnel-side heat-radiating heat sink that is provided corresponding to said light-tunnel-side heat-receiving heat sink and a phosphor wheel-side heat-radiating heat sink that is provided corresponding to said phosphor wheel-side heat-receiving heat sink.

(Supplementary Note 3)

The light source unit as set forth in supplementary notes 1 or 2, wherein:

a light tunnel is made up of a first light tunnel that is irradiated by emitted light of a solid-state light source that emits excitation light that excites said phosphor and a second light tunnel that is irradiated by emitted light of a solid-state light source that emits light of a prescribed wavelength; and said window provided in said first wall is made up of a first window that allows the passage of emitted light of said first light tunnel and a second window that allows the passage of the emitted light of said second light tunnel.

(Supplementary Note 4)

The light source unit as set forth in supplementary note 3, wherein said first light tunnel is arranged closer to said light tunnel-side circulation fan than is said second light tunnel.

(Supplementary Note 5)

The light source unit as set forth in any one of supplementary notes 1 to 4, further comprising a second wall provided between said light tunnel-side circulation fan and said light tunnel-side heat-receiving heat sink so as to partition gas that is supplied to said light tunnel-side circulation unit by means of said light tunnel-side circulation fan and gas that is directed to said light tunnel-side heat-receiving heat sink.

(Supplementary Note 6)

The light source unit as set forth in any one of supplementary notes 1 to 6, further comprising a third wall that is provided between said phosphor wheel-side circulation fan and said phosphor wheel-side heat-receiving heat sink so as to partition gas that is supplied to said phosphor wheel-side circulation unit by means of said phosphor wheel-side circulation fan and gas that is directed to said phosphor wheel-side heat-receiving heat sink.

(Supplementary Note 7)

The light source unit as set forth in supplementary note 6, wherein said phosphor wheel is arranged closer to said phosphor wheel-side circulation fan in the space that is partitioned by said third wall.

(Supplementary Note 8)

A cooling method of a light source unit comprising steps of:

accommodating a light tunnel into which is irradiated the output light of a solid-state light source in a light-tunnel-side circulation unit;

accommodating a phosphor wheel that is excited by the emitted light of said light tunnel in a phosphor-wheel-side circulation unit;

providing a first wall between said light-tunnel-side circulation unit and said phosphor-wheel-side circulation unit, said wall being provided with a window that allows the passage of emitted light of said light tunnel;

providing a light-tunnel-side heat-receiving heat sink in said light-tunnel-side circulation unit;

supplying and circulating gas that has passed by way of said light-tunnel-side heat-receiving heat sink by means of a light-tunnel-side circulation fan and directing the gas to said light-tunnel-side heat-receiving heat sink;

providing a phosphor wheel-side heat-receiving heat sink in said phosphor-wheel-side circulation unit;

supplying and circulating gas that has passed by way of said phosphor wheel-side heat-receiving heat sink by means of a phosphor wheel-side circulation fan in said phosphor-wheel-side circulation unit and directing the gas to said phosphor wheel-side heat-receiving heat sink;

connecting a heat-radiating heat sink to said light-tunnel-side heat-receiving heat sink and said phosphor wheel-side heat-receiving heat sink by means of a heat pipe; and cooling said heat-radiating heat sink by means of a cooling fan.

REFERENCE SIGNS LIST

1 light tunnel-side circulation unit
2 phosphor wheel-side circulation unit 3 heat sink cooling fan
10 light tunnel-side heat-receiving heat sink
11 wall
13 phosphor wheel-side heat-radiating heat sink
14 phosphor wheel-side heat-receiving heat sink
15, 16 window
31 phosphor wheel-side circulation fan
36 light tunnel-side circulation fan
46 phosphor wheel-side heat-radiating heat sink

What is claimed is:

1. A light source unit comprising:
a light-tunnel-side circulation unit that accommodates a light tunnel that is irradiated by the output light of a solid-state light source;
a phosphor wheel-side circulation unit that accommodates a phosphor wheel that is excited by the emitted light of said light tunnel;
a first wall that is provided between said light-tunnel-side circulation unit and said phosphor-wheel-side circulation unit and that is provided with a window through which the emitted light of said light tunnel passes;
a light tunnel-side heat-receiving heat sink that is provided in said light-tunnel-side circulation unit;
a light tunnel-side circulation fan that supplies and circulates gas that has passed by way of said light-tunnel-side heat-receiving heat sink, through said light-tunnel-side circulation unit, and toward said light-tunnel-side heat-receiving heat sink;
a phosphor wheel-side heat-receiving heat sink that is provided in said phosphor-wheel-side circulation unit;
a phosphor wheel-side circulation fan that supplies and circulates gas that has passed by way of said phosphor wheel-side heat-receiving heat sink, through said phosphor-wheel-side circulation unit, and toward said phosphor wheel-side heat-receiving heat sink;
a heat-radiating heat sink that is connected to said light-tunnel-side heat-receiving heat sink and said phosphor wheel-side heat-receiving heat sink by means of a heat pipe; and
a cooling fan that cools said heat-radiating heat sink.

2. The light source unit as set forth in claim 1, wherein said heat-radiating heat sink is made up of a light-tunnel-side heat-radiating heat sink that is provided corresponding to said light-tunnel-side heat-receiving heat sink and a phosphor wheel-side heat-radiating heat sink that is provided corresponding to said phosphor wheel-side heat-receiving heat sink.

3. The light source unit as set forth in claim 1, wherein:
a light tunnel is made up of a first light tunnel that is irradiated by emitted light of a solid-state light source that emits excitation light that excites said phosphor and a second light tunnel that is irradiated by emitted light of a solid-state light source that emits light of a prescribed wavelength; and
said window provided in said first wall is made up of a first window that allows the passage of emitted light of said first light tunnel and a second window that allows the passage of the emitted light of said second light tunnel.

4. The light source unit as set forth in claim 3, wherein said first light tunnel is arranged closer to said light tunnel-side circulation fan than said second light tunnel.

5. The light source unit as set forth in claim 1, further comprising a second wall provided between said light tunnel-side circulation fan and said light tunnel-side heat-receiving heat sink so as to partition gas that is supplied to said light tunnel-side circulation unit by means of said light tunnel-side circulation fan and gas that is directed to said light tunnel-side heat-receiving heat sink.

6. The light source unit as set forth in claim 1, further comprising a third wall that is provided between said phosphor wheel-side circulation fan and said phosphor wheel-side heat-receiving heat sink so as to partition gas that is supplied to said phosphor wheel-side circulation unit by means of said phosphor wheel-side circulation fan and gas that is directed to said phosphor wheel-side heat-receiving heat sink.

7. The light source unit as set forth in claim 6, wherein said phosphor wheel is arranged closer to said phosphor wheel-side circulation fan in the space that is partitioned by said third wall.

8. A cooling method of a light source unit comprising steps of:
accommodating a light tunnel into which is irradiated the output light of a solid-state light source in a light-tunnel-side circulation unit;
accommodating a phosphor wheel that is excited by the emitted light of said light tunnel in a phosphor-wheel-side circulation unit;
providing a first wall between said light-tunnel-side circulation unit and said phosphor-wheel-side circulation unit, said wall being provided with a window that allows the passage of emitted light of said light tunnel;
providing a light-tunnel-side heat-receiving heat sink in said light-tunnel-side circulation unit;
supplying and circulating gas that has passed by way of said light-tunnel-side heat-receiving heat sink by means of a light-tunnel-side circulation fan and directing the gas to said light-tunnel-side heat-receiving heat sink;
providing a phosphor wheel-side heat-receiving heat sink in said phosphor-wheel-side circulation unit;
supplying and circulating gas that has passed by way of said phosphor wheel-side heat-receiving heat sink by means of a phosphor wheel-side circulation fan in said phosphor-wheel-side circulation unit and directing the gas to said phosphor wheel-side heat-receiving heat sink;
connecting a heat-radiating heat sink to said light-tunnel-side heat-receiving heat sink and said phosphor wheel-side heat-receiving heat sink by means of a heat pipe; and
cooling said heat-radiating heat sink by means of a cooling fan.

* * * * *